US005904459A

United States Patent [19]

Prathap et al.

[11] Patent Number: 5,904,459

[45] Date of Patent: May 18, 1999

[54] FASTENER APPARATUS AND SYSTEM WITH SELF-SETTING TORQUE AND OVER-TORQUE PROTECTION

[75] Inventors: Rathnasabapathy Prathap, Carol Stream; Thomas E. Kulack; Frank E. Kazak, both of Algonquin, all of Ill.

[73] Assignee: Motorola Inc., Schaumburg, Ill.

[21] Appl. No.: 08/868,158

[22] Filed: Jun. 3, 1997

[51] Int. Cl.[6] ............................ F16B 31/00; F16B 33/04; F16B 37/08

[52] U.S. Cl. ................................ 411/6; 411/433; 411/437

[58] Field of Search ................................ 411/6, 3–5, 399, 411/433, 437, 338, 339, 324

[56] References Cited

U.S. PATENT DOCUMENTS

| | | | |
|---|---|---|---|
| 2,156,002 | 4/1939 | Tinnerman | 411/437 |
| 2,401,672 | 6/1946 | Tinnerman | 411/437 |
| 2,882,781 | 4/1959 | Gates | 411/433 X |
| 3,168,333 | 2/1965 | Dziura | 411/437 |
| 3,299,767 | 1/1967 | Royer | 411/433 |
| 3,685,782 | 8/1972 | Kowall | 411/399 X |
| 4,802,804 | 2/1989 | Hirohata | 411/433 |

*Primary Examiner*—Neill Wilson
*Attorney, Agent, or Firm*—Nicholas C. Hopman

[57] ABSTRACT

A fastener apparatus and system for fastening an article through an opening in a mounting plate (501) includes a retaining nut (101) with a head portion (103) having a face surface (105), and a barrel portion (107) emanating from the face surface (105). The barrel portion (107) has a radially threaded surface (109) disposed on an interior portion (111) thereof commencing at a first position (113) proximate the face surface (105) and terminating at a second position (115) apart from the face surface (105). At least one longitudinal aperture (117) is disposed through a wall (119) of the barrel portion (107) commencing at the second position (115) and terminating at a third position (121), apart from the first position (113). The at least one longitudinal aperture (117) has a geometry that that relieves stress caused by force radially-applied to the head portion (103) of the retaining nut (101) when it is tightened around a mating threaded post.

17 Claims, 4 Drawing Sheets

FASTENER APPARATUS AND SYSTEM WITH SELF-SETTING TORQUE AND OVER-TORQUE PROTECTION

FIELD OF THE INVENTION

This invention is related to the field of mechanical packaging, and is particularly useful for mounting physical objects in a field environment.

BACKGROUND OF THE INVENTION

Physical objects, such as antennas must have provision for field installation. In particular, in a radio-based system, such as a G.P.S. (Global Positioning System) a radio portion is typically installed inside a vehicle. An antenna needs to be mounted on the exterior of the vehicle so it is able to receive signals from satellites. Since these G.P.S. systems are often installed in the field, rather than in a factory environment where assembly can be controlled precisely, the antenna mounting mechanism and method needs to be intolerant to improper installation. Typically, the antenna is installed through a hole in vehicle's trunk, or elsewhere through a sheet metal or fiberglass body panel. Since the operating environment of a vehicle can include wide temperature excursions, and high intensity shock and vibration, the antenna must be fastened securely to survive and remain attached to the mounting location.

A standard technique is to affix the antenna through the vehicle's body panel using a fastener. During installation the fastener is progressively tightened by applying a radial force. As the radial force is applied, the antenna and the fastener clamp around the body panel. To withstand the severe vehicular environment the fastener needs to be radially torqued to a prescribed torque rating. One common problem with this is that a special wrench with a torque indication must be used to ensure that the proper torque rating is applied.

As a practical matter many field installers of these G.P.S. antennas do not use a torque wrench and often tighten the fastener without regard to the actual force applied to the fastener. For that matter installers rarely reads installation instructions where recommendation on torque are stated. These situations rarely result in a properly torqued fastener, and often results in an over-torqued fastener because the installer wants to make sure the antenna is securely mounted. Since the antenna fasteners are typically threaded, quite often the threads are stripped, especially in the case of thermoplastic based fasteners and antennas. If stripped the antenna and fastener need to be replaced. This is not only costly but very inconvenient for the field installer. Moreover, if the fastener threads are partially fatigued due to excessive application of force the installer may not detect it, and the antenna-fastener assembly can fail later in the field. So field reliability is also a major concern.

On the other hand, if the fastener is not torqued enough, the antenna can fall off.

What is needed is an improved fastening system that is easy to install, and is reliable independent of the field installation abuse.

DETAILED DESCRIPTION OF A PREFERRED EMBODIMENT

A fastener apparatus and system for fastening an article through an opening in a mounting plate includes a retaining nut with a head portion having a face surface, and a barrel portion emanating from the face surface. The barrel portion has a radially threaded surface disposed on an interior portion thereof commencing at a first position proximate the face surface and terminating at a second position apart from the face surface. At least one longitudinal aperture is disposed through a wall of the barrel portion commencing at the second position and terminating at a third position, apart from the first position. The at least one longitudinal aperture has a geometry that that relieves stress caused by force radially-applied to the head portion of the retaining nut, when it is tightened around a mating threaded post.

Figure 1:
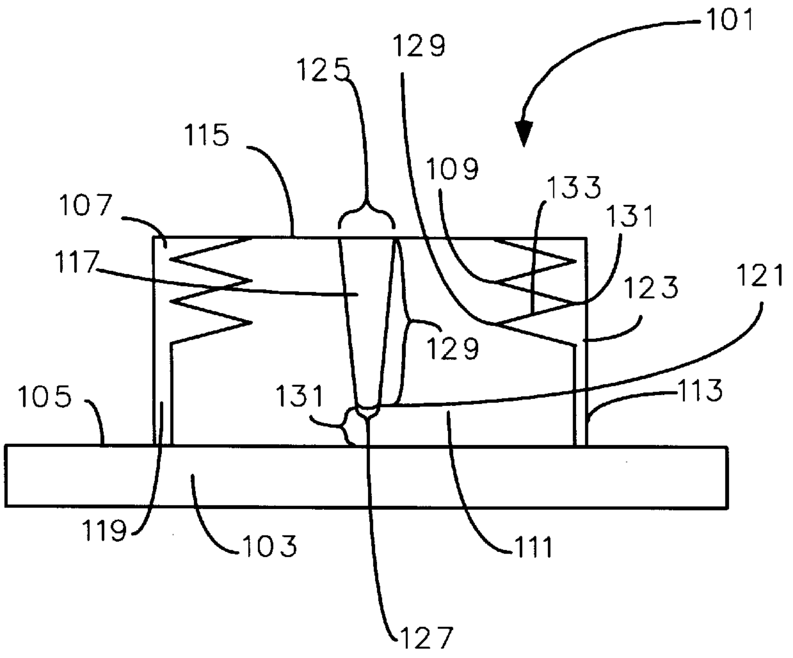
FIG. 1 is a schematic drawing of a cross-sectional view of a retaining nut in accordance with an embodiment of the invention.

Details of the fastener are illustrated in FIG. 1. FIG. 1 is a schematic drawing of a cross-sectional view of a fastener, or retaining nut, in accordance with an embodiment of the invention. A retaining nut 101 includes a head portion 103 with a face surface 105. A barrel portion 107 emanates from the face surface 105 and has a radially threaded surface 109 disposed on an interior portion 111 thereof commencing at a first position 113, proximate the face surface 105, and terminating at a second position 115 apart from the face surface 105. Preferably, the barrel portion 107 has a substantially cylindrical geometry. At least one longitudinal aperture 117 is disposed through a wall 119 of the barrel portion 107 commencing at the second position 115 and terminating at a third position 121, apart from the first position 113. Preferably, the retaining nut 101 is formed of injection molded thermoplastic. Nylon is a preferred material because of its elasticity, as well as its strength properties. Note that the wall 119 commences on an outside surface 123 of the barrel portion 107 and terminates at the radially threaded surface 109. The longitudinal aperture 117 is used to prevent stripping of the radially threaded surface 109 when it is mated with another threaded surface. The radially threaded surface 109 includes crests 129 connected to valleys 131 by flanks 133.

Figure 2:
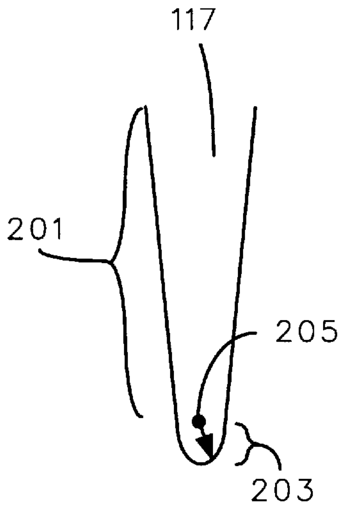
FIG. 2 is a schematic illustration of a cross-sectional view of an aperture feature of the retaining nut shown in FIG. 1.

Before delving into the system application, further details of various aperture geometries will be detailed. FIG. 2 shows a cross-sectional view of the aperture feature of the retaining nut shown in FIG. 1. Here, the aperture is defmed bounded by a first dimension 125 commencing at the second position 115 and a second dimension 127 at the third position 121. The second dimension 127 of the aperture 117 is smaller than the first dimension 125. Furthermore, the aperture 117 is comprised of a first portion 201 and a second (relief) portion 203, where the second portion 203 is defined by a radial shape 205. Note that the aperture shown has an angular draft geometry. This is convenient for an injection, or insertion, molding process but is not required for proper function. Note also that a proportional relationship between the depth of the aperture 117, shown at reference number 129, and the distance between the third position 121 and the face surface 105 of the head portion 103 of the retaining nut 101, shown at reference number 131, helps determine the torque necessary to make the retaining nut slip as described later. Preferably, the dimension represented by reference number 129 exceeds the dimension represented by reference number 131.

As will be detailed later, a radial force will be applied to the head portion 103 of the retaining nut 101. When the radial force is applied, the threaded portion of the retaining nut 101 will cause the aperture 117 to open up, causing stress in the relief portion 203 of the aperture. If the stress is too excessive, then the thermoplastic material of the retaining nut 101 will crack.

Figure 3:
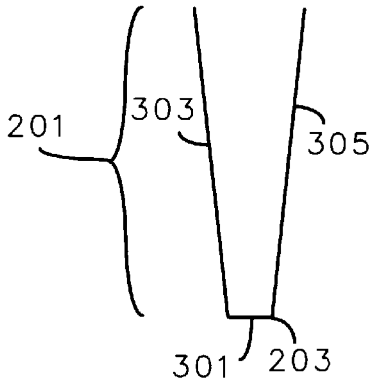
FIG. 3 is a schematic drawing of a cross-sectional view of an aperture feature of the retaining nut shown in FIG. 1.

In another embodiment shown in FIG. 3, the second portion 203 of the aperture 117 is defined by a horizontal wall portion 301 oriented substantially perpendicular to vertical wall portions 303, 305 defining the first portion 201.

Figure 4:
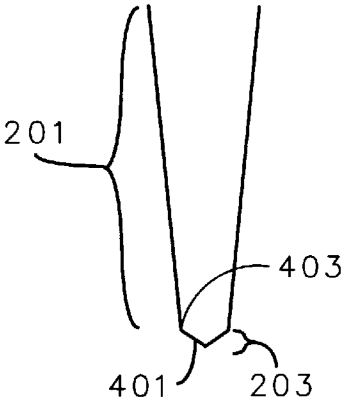
FIG. 4 is a schematic illustration of a cross-sectional view of an aperture feature of the retaining nut shown in FIG. 1.

In another embodiment shown in FIG. 4, the second portion 203 is defined by a v-shaped wall portion 401 commencing at a terminating portion 403 of the first portion 201, and terminating apart from the terminating portion 403.

In summary, the second portion 203 of the aperture 117, is applied to reduce stress in area of the retaining nut 101 that defmed the termination of the aperture 117. Although three embodiments have been shown, those skilled in the art will be able to derive other geometries for the relief portion 203 that substantially provide the same benefit.

Figure 5A:
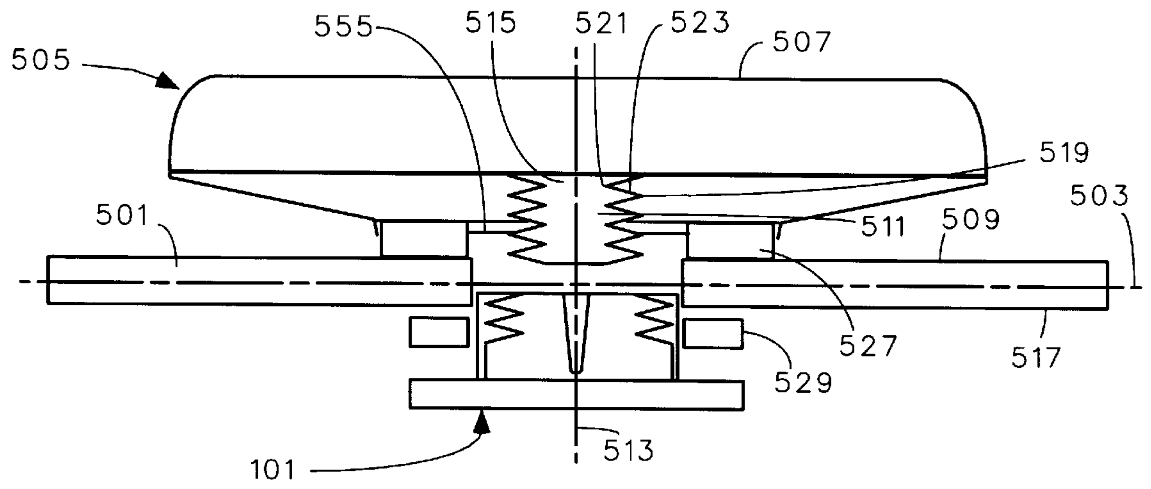
FIGS 5A, 5B, and 5C are schematic drawings of a system for fastening an article through an opening in a mounting plate, in accordance with a system embodiment of the invention.
Figure 5B:
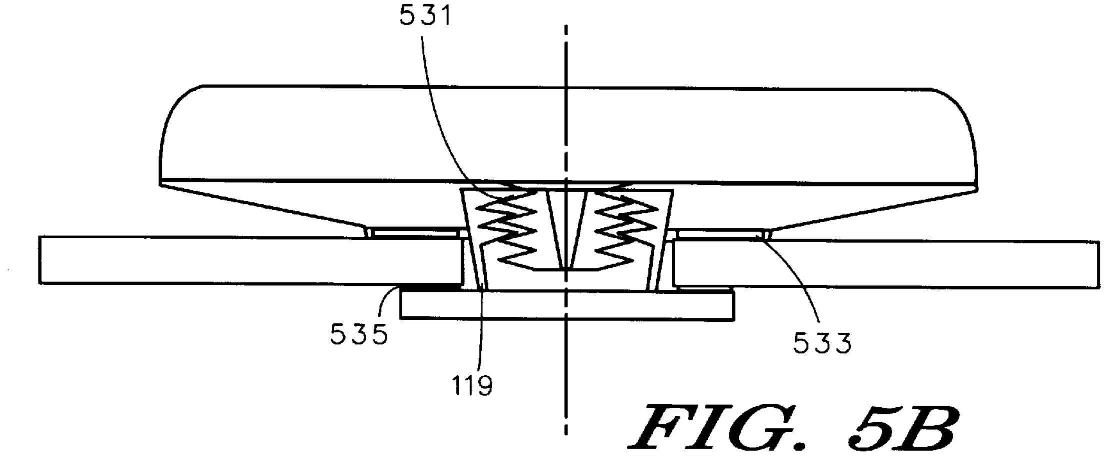
Figure 5C:
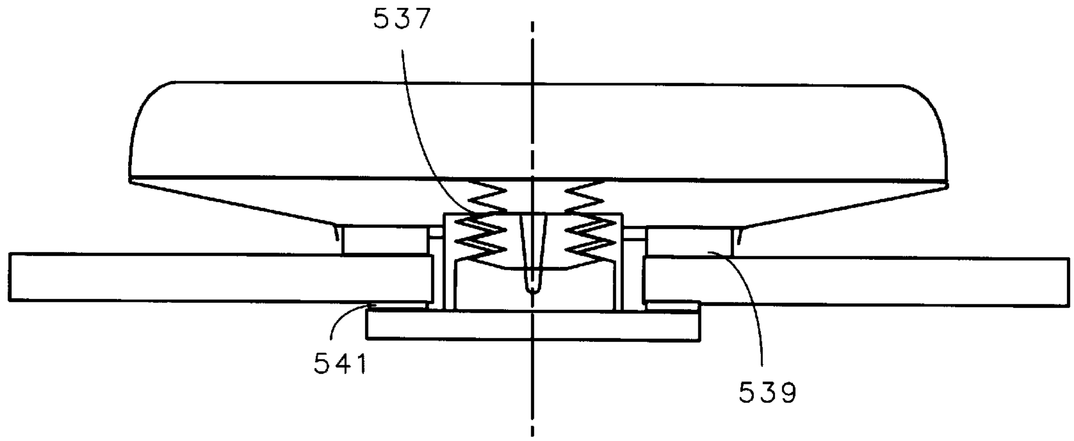

Next, FIG. 5 will be introduced. FIGS. 5A, 5B, and 5C are schematic drawings of a system for fastening an article through an opening in a mounting plate, in accordance with a system embodiment of the invention.

A mounting plate 501 is oriented along a first axis 503. In a vehicular application, the mounting plate 501 may be a trunk lid. A base unit 505 (here a G.P.S. antenna) has a body portion 507 positioned on a first side 509 of the mounting plate 501. The G.P.S. antenna 505 has a shank member 511 emanating therefrom and disposed oriented coaxial with a second axis 513 oriented perpendicular to the first axis 503. The shank member 511 has a threaded surface 515 disposed radially around an exterior portion thereof. The threaded surface 515 includes crests 519 connected to valleys 521 by flanks 523.

The retaining nut 101 structure described earlier is positioned on a side 517 opposite the first side of the mounting plate 501. Here the barrel portion 107 of the retaining nut 101 is disposed oriented coaxial with the second axis. When a force is radially applied to the head portion 103 of the retaining nut 101, the radially threaded surface 109 disposed on an interior portion 111 of the retaining nut 101 progressively engages with the threaded surface 515 disposed radially around the exterior portion of the shank member 511 of the G.P.S. antenna 505. This action causes the interior portion 111 of the retaining nut 101 to surround the threaded surface 515 of the shank member 511. The radially applied force causes the retaining nut 101 to move in a first axial direction along the second axis 513. Also, responsive to the force that is radially applied, the first dimension 125 of the at least one longitudinal aperture 117 progressively increases outwardly until a thread crest, of the radially threaded surface 109 disposed on the interior portion 111 of the barrel portion 107 of the retaining nut 101, traverses over a thread crest, (shown at reference number 531 in FIG. 5B) of the threaded surface 515 disposed radially around an exterior portion of the shank member 511 of the base unit 505, causing the retaining nut 101 to transition in another axial direction opposing the first axial direction along the second axis 513. Here is where the retaining nut 101 essentially slips rearwardly to prevent stripping of the threads of both the shank member 511 of the base unit 505 and the radially threaded surface 109 disposed on the interior portion 111 of the barrel portion 107 of the retaining nut 101. While the first dimension 125 of the at least one longitudinal aperture 117 progressively increases outwardly, the wall 119 is deformed outwardly. So, essentially, the retaining nut 101 expands outwardly under the radially applied force while the head portion 103 and barrel portion 107 are moving axially along the second axis 513 until it slips in a backward or reverse direction. The deflection, or deformation of the wall 119, and the slippage of the threads is caused after the face surface 105 of the head portion 103 of the retaining nut 101 interferes with the side 517 opposite the first side of the mounting plate 501. When the slip of the threads occurs an audible click is heard by the installer, reminding the installer that the retaining nut 101 has slipped. The (after slip) thread flank positions are shown at reference number 537 in FIG. 5C. Next, the retaining nut 101 is turned ½ to ¾ turn to maintain engagement between the threaded surfaces to a predetermined torque setting.

By using the described apparatus and system with mating thermoplastic-type threads, an installer can automatically, and easily, apply a minimum torque on the assembly. The installer does not need to worry about accidentally breaking the assembly. The described structure does not require a calibrated custom torque wrench at the installation site. Furthermore, the described structure provides an audible click which tells the installer the minimum torque has been applied. Using this physical reference point, the installer can torque it higher or “DIAL in the TORQUE” to a set number, e.g. half a rotation from reference point gives 8 in. lbs.

Optionally, damping washers 527 and 529, shown in FIG. 5A, can be placed on either or both sides of the mounting plate 501 without ever worrying about bottoming out of the retaining not 101. The washers are compressed, as shown in FIG. 5B, and then released to a set point where it is not bottomed out anymore with the mounting plate 501, as shown in FIG. 5C at reference numbers 539 and 541. By this way, the described structure provides ample spring/damping relief automatically for the damping washers. The damping washers 527 and 529 also provide a fluid resistant seal, and hold the retaining nut in place better—thus allowing a higher minimum holding torque. Testing has shown that a 100 percent increase in minimum torque value is easily achievable using the damping washers 527 and 529. Preferably, the damping washers 527 and 529 are relatively compliant. The washers may be rubber, foam, or rubber coated metal.

Various torques can be applied depending on the exact mounting application. Here are some examples of various torque settings available with the described structure.

TABLE 1

Mean Torque Value (in. lbs) with single washer GPS Antenna - Direct Mount

| No. | Minimum value | ½ to ¾ Turn value of cable retaining nut | Maximum value before the threads disengages itself |
|---|---|---|---|
| 1 | — | 9 | 15 |
| 2 | approx. | 9 | 12 |
| 3 | 2 in. lbs | 9 | 10 |
| 4 | | 9 | 10 |
| 5 | | 9 | 9 |
| 6 | | 9 | 9 |
| 7 | | 9 | 9 |
| 8 | | 8 | 8 |
| 9 | | 7 | 8 |
| 10 | | 7 | 8 |

TABLE 2

Mean Torque Values (in. lbs) with dual washers GPS Antenna - Direct Mount

| No. | Minimum value | ½ to ¾ Turn value of cable retaining nut | Maximum value before the threads disengages itself |
|---|---|---|---|
| 1 | — | 8 | 12 |
| 2 | approx. | 8 | 10 |
| 3 | 4 in. lbs | 8 | 10 |
| 4 | | 8 | 10 |
| 5 | | 8 | 9 |
| 6 | | 8 | 8 |
| 7 | | 8 | 8 |
| 8 | | 8 | 8 |
| 9 | | 8 | 8 |
| 10 | | 7 | 8 |

Figure 6A:
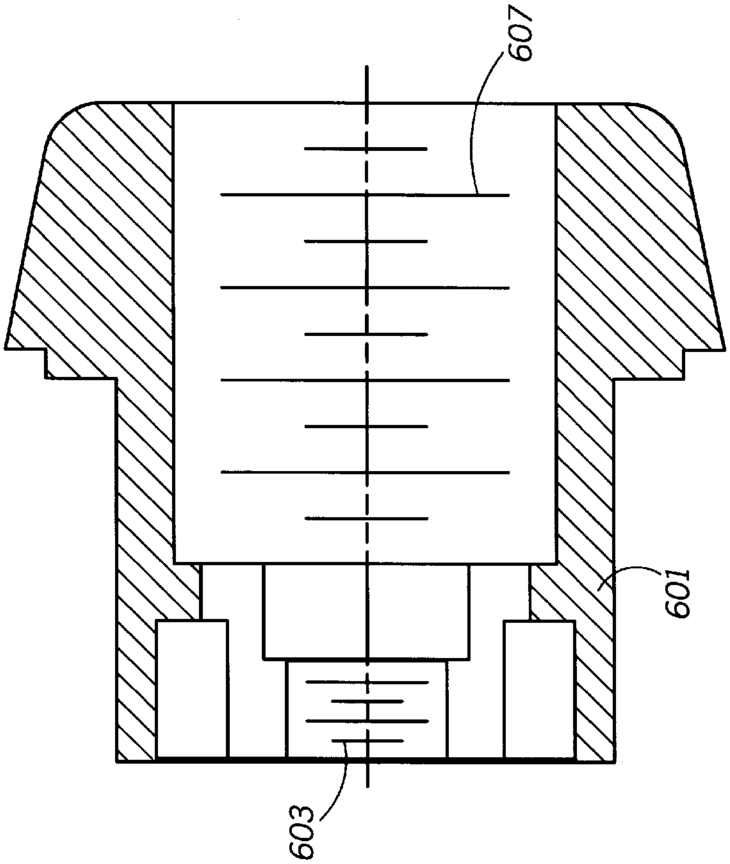
FIG. 6A is a schematic illustration of a cross-sectional view of a retaining nut, in accordance with an alternative embodiment.

FIG. 6A is a schematic illustration of a cross-sectional view of a retaining nut, in accordance with an alternative embodiment. Reference number 601 shows the alternative retaining nut, and reference number 603 shows the threads equivalent to the radially threaded surface 109 disposed on the interior portion 111 of the barrel portion 107 of the retaining nut 101, shown in the FIG. 1 embodiment. In this embodiment the deflection, or deformation of the alternative retaining nut's wall, and the subsequent slippage of the threads is caused after a face surface 609 of the alternative retaining nut 601 interferes with a deformable surface 555 of the base unit 505 (shown in FIG. 5A). In this alternative embodiment a mounting plate 501 is not used. Another radially threaded surface 607 is provided within the alternative retaining nut 601. This radially threaded surface 607 allows the retaining nut 601 to be screwed into a threaded pole. This embodiment is meant for a marine application where the antenna structure is to be pole-mounted.

Figure 6B:
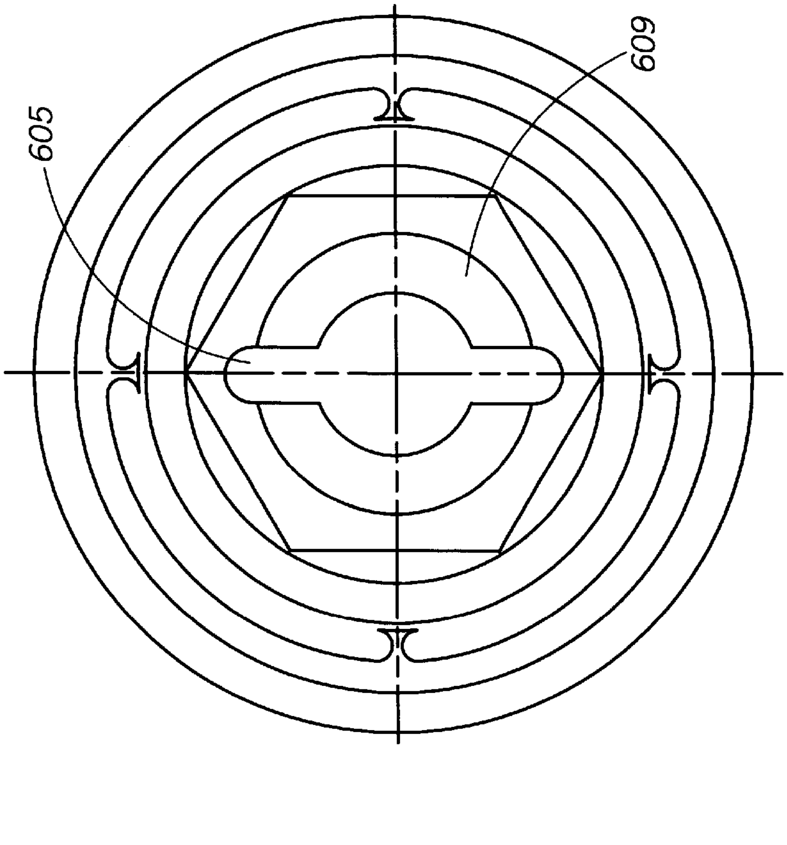
FIG. 6B is an end view of the retaining nut shown in FIG. 6A.

FIG. 6B is an end view of the retaining shown in FIG. 6A. Reference number 605 shows the aperture in this embodiment.

Figure 7:
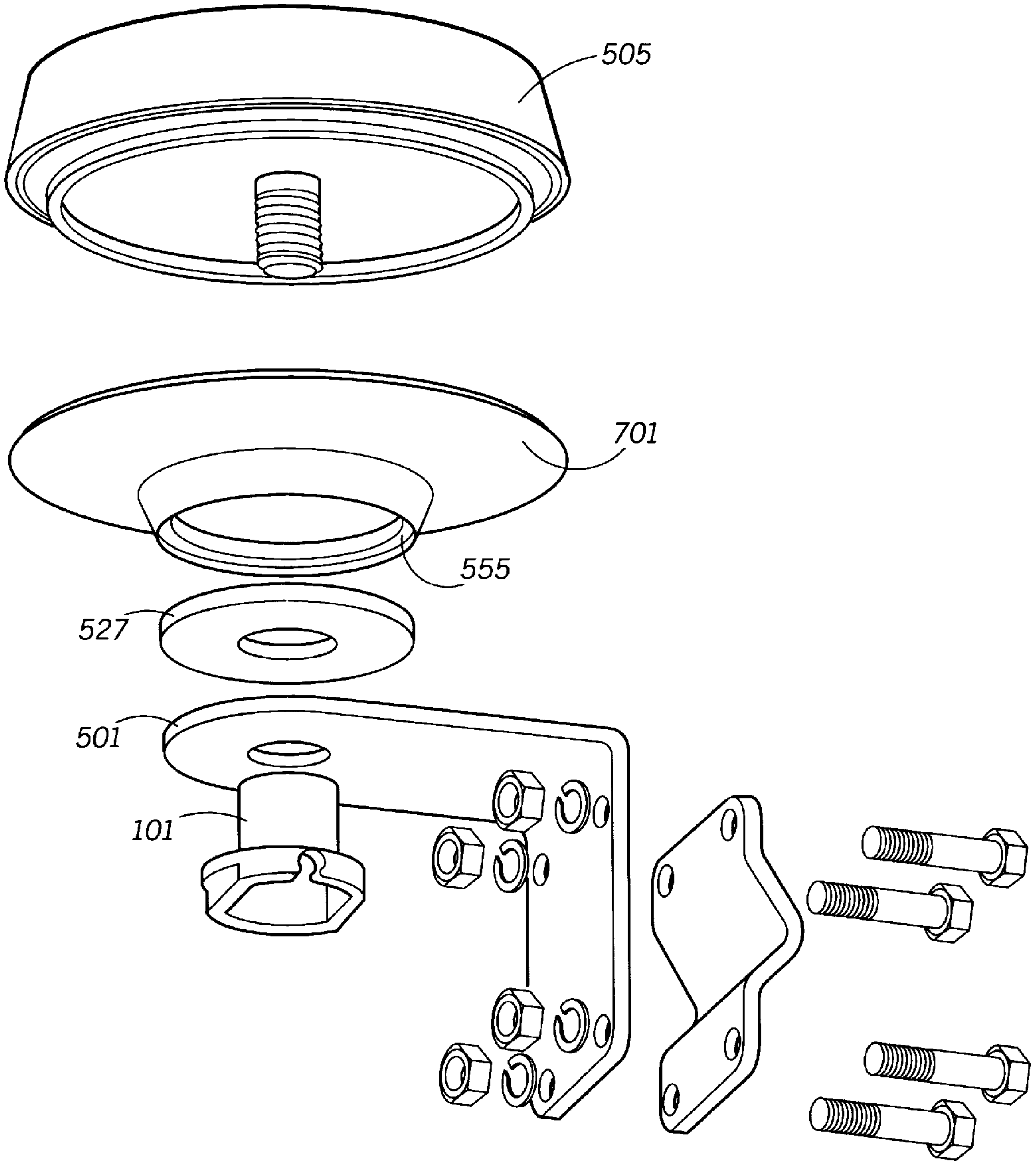
FIG. 7 is an isometric drawing of the complete system assembly onto a mounting bracket.

FIG. 7 is an isometric drawing of the complete system assembly onto a mounting bracket. This figure is shown so that the reader may better understand a complete mounting application. The retaining nut 101 clamps to one side of the mounting plate 501 (here a bracket). A compressible washer 527 is positioned on an opposite side of the mounting plate 501. The base unit 501 and a cover 701 are compress the washer 527 against the mounting plate 501 when the retaining nut 101 is radially torqued on. The above-mentioned deformable mating surface 555 is also shown to illustrate how the alternative retaining nut 601 functions.

In conclusion, an improved fastening apparatus and system has been described that is not only is easy to install but is also reliable independent of the field installation abuse. The aperture feature 117 in the retaining nut 101 has a geometry that not only defines a predetermined torque but also allows an over tightened retaining nut 101 to slip which prevents the threads from stripping.

What is claimed is:

1. A fastener apparatus comprising:

a head portion having a face surface; and a barrel portion emanating from the face surface, the barrel portion having a radially threaded surface disposed on an interior portion thereof commencing at a first position, proximate the face surface, and terminating at a second position apart from the face surface, wherein at least one longitudinal aperture is disposed through a wall of the barrel portion commencing at the second position and terminating at a third position, apart from the first position, wherein the at least one longitudinal aperture is defined bounded by a first dimension commencing at the second position and a second dimension at the third position, and wherein the second dimension of the at least one longitudinal aperture is smaller than the first dimension.

2. An apparatus in accordance with claim 1 wherein the barrel portion has a substantially cylindrical geometry.

3. An apparatus in accordance with claim 1 further comprising a plurality of longitudinal apertures.

4. An apparatus in accordance with claim 1 wherein a distance between the third position and the face surface is less than a distance between the second position and the third position.

5. A fastener apparatus comprising:

a head portion having a face surface;

a barrel portion emanating from the face surface, the barrel portion having a radially threaded surface disposed on an interior portion thereof commencing at a first position, proximate the face surface, and terminating at a second position apart from the face surface, wherein at least one longitudinal aperture is disposed through a wall of the barrel portion commencing at the second position and terminating at a third position, apart from the first position, wherein the wall of the barrel portion commences on an outside surface of the barrel portion and terminates at the radially threaded surface, where the at least one longitudinal aperture is defined bounded by a first dimension commencing at the second position and a second dimension at the third position, wherein the second dimension of the at least one longitudinal aperture is smaller than the first dimension, and wherein the at least one longitudinal aperture is comprised of a first portion and a second portion, wherein the second portion is defined by a radial shape.

6. An apparatus in accordance with claim 5 wherein the at least one longitudinal aperture is comprised of a first portion and a second portion, wherein the second portion is defined by a horizontal wall portion oriented substantially perpendicular to vertical wall portions defining the first portion.

7. An apparatus in accordance with claim 5 wherein the at least one longitudinal aperture is comprised of a first portion and a second portion, wherein the second portion is defined by a v-shaped wall portion commencing at a terminating portion of the first portion, and terminating apart from the terminating portion.

8. A system for fastening an article through an opening in a mounting plate that is oriented along a first axis, the system comprising:

a base unit having a body portion positioned on a first side of the mounting plate, the base unit having a shank member emanating therefrom and disposed oriented coaxial with a second axis oriented perpendicular to the first axis, wherein the shank member has a threaded surface disposed radially around an exterior portion thereof;

a retaining nut is positioned on a side opposite the first side of the mounting plate, the retaining nut having a head portion with a face surface, and a barrel portion emanating from the face surface and disposed oriented coaxial with the second axis, the barrel portion having a radially threaded surface disposed on an interior portion thereof commencing at a first position, proximate the face surface, and terminating at a second position apart from the face surface, wherein at least one longitudinal aperture is disposed through a wall of the barrel portion commencing at the second position and terminating at a third position, apart from the first position, the at least one longitudinal aperture be bounded by a first dimension commencing at the second position and a second dimension at the third position wherein when a force is radially applied to the head portion of the retaining nut, the radially threaded surface disposed on an interior portion of the retaining nut progressively engages with the threaded surface disposed radially around the exterior portion of the shank member of the base unit which causes the retaining nut to move in an axial direction along the second axis, and responsive to the force that is radially applied, the first dimension of the at least one longitudinal aperture progressively increases outwardly until a crest of the radially threaded surface disposed on the interior portion of the barrel portion of the retaining nut traverses over a crest of the threaded surface disposed radially around an exterior portion of the shank member of the base unit causing the retaining nut to transition in another axial direction opposing the axial direction along the second axis.

9. A system in accordance with claim 8 wherein the wall of the barrel portion commences on an outside surface of the barrel portion and terminates at the radially threaded surface.

10. A system in accordance with claim 9 wherein the at least one longitudinal aperture is defined bounded by a first dimension commencing at the second position and a second dimension at the third position.

11. A system in accordance with claim 10 wherein the second dimension of the at least one longitudinal aperture is smaller than the first dimension.

12. A system in accordance with claim 11 wherein the at least one longitudinal aperture is comprised of a first portion and a second portion, wherein the second portion is defined by a radial shape.

13. A system in accordance with claim 11 wherein the at least one longitudinal aperture is comprised of a first portion and a second portion, wherein the second portion is defined by a horizontal wall portion oriented substantially perpendicular to vertical wall portions defining the first portion.

14. A system in accordance with claim 11 wherein the at least one longitudinal aperture is comprised of a first portion and a second portion, wherein the second portion is defined by a v-shaped wall portion commencing at a terminating portion of the first portion, and terminating apart from the terminating portion.

15. A system in accordance with claim 8 wherein the barrel portion has a substantially cylindrical geometry.

16. A system in accordance with claim 8 further comprising a plurality of longitudinal apertures.

17. A system in accordance with claim 8 wherein a distance between the third position and the face surface is less than a distance between the second position and the third position.

* * * * *